US008935328B2

(12) United States Patent
Tumuluri (10) Patent No.: US 8,935,328 B2
(45) Date of Patent: Jan. 13, 2015

(54) SYSTEM AND METHOD FOR COLLABORATIVE 3D VISUALIZATION AND REAL-TIME INTERACTION ON A COMPUTER NETWORK

(76) Inventor: Ramakrishna J Tumuluri, Hyderabad (IN)

( * ) Notice: Subject to any disclaimer, the term of this patent is extended or adjusted under 35 U.S.C. 154(b) by 214 days.

(21) Appl. No.: 13/233,051

(22) Filed: Sep. 15, 2011

(65) Prior Publication Data

US 2013/0073619 A1    Mar. 21, 2013

(51) Int. Cl.
| | |
|---|---|
| G06F 15/16 | (2006.01) |
| H04N 13/02 | (2006.01) |
| G06T 19/20 | (2011.01) |
| A63F 13/30 | (2014.01) |
| H04L 29/06 | (2006.01) |
| G06Q 10/10 | (2012.01) |
| H04M 3/56 | (2006.01) |
| H04N 13/00 | (2006.01) |

(52) U.S. Cl.
CPC ............ *H04N 13/0296* (2013.01); *G06T 19/20* (2013.01); *A63F 13/12* (2013.01); *H04L 67/38* (2013.01); *G06Q 10/101* (2013.01); *H04M 3/567* (2013.01); *H04N 13/00* (2013.01); *H04N 13/0051* (2013.01); *H04N 13/0059* (2013.01); *G06T 2219/024* (2013.01); *G06T 2219/2012* (2013.01); *G06T 2219/2016* (2013.01); *G06T 2219/2024* (2013.01); *H04L 63/0823* (2013.01); *H04L 65/403* (2013.01)
USPC ........................................................ 709/204

(58) Field of Classification Search
CPC .......... G06T 15/00; G06T 19/00; G06T 19/20
USPC ............................................................ 709/204
See application file for complete search history.

(56) References Cited

U.S. PATENT DOCUMENTS

| | | | | |
|---|---|---|---|---|
| 5,977,978 | A * | 11/1999 | Carey et al. ................... | 345/419 |
| 7,353,252 | B1 * | 4/2008 | Yang et al. .................... | 709/204 |
| 8,214,423 | B2 * | 7/2012 | Freitag .......................... | 709/201 |
| 2003/0103089 | A1 * | 6/2003 | Ramani et al. ................ | 345/848 |
| 2003/0115268 | A1 * | 6/2003 | Esposito ....................... | 709/205 |
| 2009/0019367 | A1 * | 1/2009 | Cavagnari et al. ............ | 715/716 |
| 2009/0157649 | A1 * | 6/2009 | Papadakis et al. ................ | 707/5 |
| 2009/0248868 | A1 * | 10/2009 | Classen et al. ................ | 709/224 |
| 2010/0318929 | A1 * | 12/2010 | Hilton et al. .................. | 715/769 |
| 2010/0325206 | A1 * | 12/2010 | Dayal et al. ................... | 709/204 |
| 2011/0087350 | A1 * | 4/2011 | Fogel et al. ..................... | 700/98 |

\* cited by examiner

*Primary Examiner* — Jason Recek (57) ABSTRACT

A system and method that provides groups of users a capability for collaborative 3D visualization and real time interaction on computer networks. Users establish a trust relationship a-priori with other users of their choice and setup sessions for collaborative visualization of "3D Models". Various 3D capable computing devices such a desktop and laptop computers, smartphones and tablets are supported. Changes made by a specific user on his "3D Model" get replicated on peer users' computer environment thereby simulating an experience of being physically co-located for the purpose of visualization and interaction. Changes to the "3D Model" for appearance, geometric transformations, lighting, and addition/deletion of sub-objects are supported for collaborative usage. Indexing and querying of "3D Models" are supported collaboratively. The power of digital certificates id leveraged to provide digital signing capability on changes made to "3D Models" or related metadata.

22 Claims, 10 Drawing Sheets

SYSTEM AND METHOD FOR COLLABORATIVE 3D VISUALIZATION AND REAL-TIME INTERACTION ON A COMPUTER NETWORK

FIELD OF THE INVENTION

The invention relates to a system and method for collaborative 3D visualization and real time interaction. More particularly, invention relates to computer network based system and method for collaborative 3D visualization and real time interaction between multiple users, wherein users can simultaneously visualize, interact, share and modify a 3D model available on a computer network. The invention also provides a system and method for collaborative real-time query of 3D models on a computer network.

BACKGROUND

Conventionally, images, videos and "3D models" have been used for visualization and can have multiple applications in modern technology like online commerce, customer support, online education, healthcare and many other fields requiring 3D visualization and interaction.

Technological advancements have enabled the new generation of computers to support real-time 3D graphics. Although, in the past, video games have been the most widely used application of 3D technology alongwith selected use of the technology in healthcare and technical training but in recent past, usage of 3D technology has dramatically increased in computers, televisions, mobiles, games and many other internet applications.

Typically, prior art comprises many offerings that allow sharing of images and videos in real-time on computer networks. One such standard is via the internet protocol XMPP. The web3d consortium has also developed and published specifications for publishing 3D information via an XML based standard X3D. This standard specifies the encoding and subsequent rendering of 3D scenes. These 3D scenes include objects, lighting, transforms and many related operations. However the usage of this model is defined in a client-server manner where the client initiates the request. This model is inline with the client-server model of the worldwide web. The term "3D Model" used hereinafter also includes "3D Scene".

One of the prior art document relating to 3D technology and relevant to the present invention comprises US 2007/0248261 by Zhou et al which discloses a system for collaborative interactive visualization of 3D data sets over a network wherein multiple persons in remote physical locations can collaboratively interactively visualize 3D data sets simultaneously. The system disclosed in this prior art comprises a main workstation and one or more remote workstations all connected through a data network each workstation having the same 3D data set loaded. A user at a remote workstation can perform a given diagnostic or therapeutic procedure or can receive instruction from another user at a main workstation where the commonly stored 3D data set is used to illustrate the lecture.

US 2011/0131250 discloses computer systems and methods for the query and visualization of multidimensional databases wherein in response to a user request, a computer generates a graphical user interface on a computer display. A schema information region of the graphical user interface includes multiple operand names, each operand name associated with one or more fields of a multi-dimensional database. A data visualization region of the graphical user interface includes multiple shelves. Upon detecting a user selection of the operand names and a user request to associate each user-selected operand name with a respective shelf in the data visualization region, the computer generates a visual table in the data visualization region in accordance with the associations between the operand names and the corresponding shelves. The visual table includes a plurality of panes, each pane having at least one axis defined based on data for the fields associated with a respective operand name.

US 2009/0089682 discloses a visualization system that generates a collaborative visualization environment in an industrial automation environment. A view component maps a plurality of displays to respective users. A visualization component dynamically generates visualization from a set of display objects to present to a user that is a function of the received information and inferred or determined entity context. A collaboration component receives instructions or requests to initiate collaboration with another user machine, or displays the collaboration component provided for joining multiple users, machines, or displays to create a common view or workspace via the view component and the visualization component.

It is apparent from the above prior art documents that development in the 3D technology has till date been limited primarily to "standalone 3d visualization" or "client-server" mode. The standalone mode being on the display of 3D graphics on individual computing devices. The client-server mode being where the "3D model" resides on the server and is brought into the client's environment via client-server protocols and then it is rendered.

Prior art does not disclose any document for sharing "3D Models" in real-time via computer networks wherein multiple users, irrespective of their locations, could directly and simultaneously interact, share and modify the 3D models in real-time across the computer networks. This as well as other problems associated with the prior have been overcome in the present invention, as it would be apparent from the forthcoming description and claims of the present application.

OBJECT OF THE INVENTION

Primary object of invention is to provide a system for simultaneous collaborative 3D visualization and real-time interaction by multiple users on a computer network.

Another object of the invention is to provide a system for simultaneous collaborative 3D visualization and real-time interaction by multiple users on a computer network, wherein each user can simultaneously interact, modify and share a 3D model with other users on the same network, irrespective of the their locations.

Another object of the invention is to provide a system for collaborative real-time query of 3D models on a computer network.

Further object of the invention is to provide a method for simultaneous collaborative 3D visualization and real-time interaction by multiple users on a computer network.

Another object of the invention is to provide a method for simultaneous collaborative 3D visualization and real-time interaction by multiple users on a computer network, wherein each user can simultaneously interact, share and modify a 3D model with other users on the same network.

A further object of the invention is to provide a method for collaborative real-time query of 3D models on a computer network.

SUMMARY OF THE INVENTION

These and other objects, features and advantages of the present invention will become more apparent upon reading the following specification in conjunction with the accompanying drawings. However, it will be understood by those skilled in the art that the foregoing general description and the following detailed description are exemplary and explanatory of the invention and are not intended to be restrictive thereof.

Accordingly, there is provided a system and method for collaborative 3D visualization and real-time interaction by multiple users on a computer network, wherein multiple users on a computer network can simultaneously visualize, interact, share and modify a selected 3D model in real time. The said 3D model may be any three dimensional object or creation and is not limited to any specific article or tools. The invention also provides a system and method for collaborative real-time query of 3D models on a computer network.

The invention allows a well defined group of multiple users to visualize a 3D model in real-time on their respective machine screens across a computer network, wherein users can perform multiple operations including but not limited to simultaneous loading of 3D model from a file store or network, simultaneously transforming objects and sub-objects in the 3D model, querying a 3D model and a database of 3D models, controlling access within a specific 3D model and digitally signing modifications within a 3D model. The multiple users can be placed at the same location or at remote locations across the globe. The invention drastically enhances the communication and collaboration between the users where visualization, more particularly, simultaneous visualization, is important. For instance in a customer support scenario a caller and callee could resolve an issue related to a "new smartphone" that they are grappling with, since the misunderstanding caused due to different visualizations is eliminated by the simultaneous visualization on their respective computer monitors. In another example, in an online commerce situation where jewellery is being considered, the buyer and seller can try out various possibilities relating to gems in the jewel which clearly enables them to simultaneously visualize the jewel in its various configurations, leading to a successful transaction.

The present invention has many applications in modern technology, which without being limited to, can be applied in "online commerce", "online education", "online customer support", "online design", "healthcare" and all those fields which lend themselves to collaborative visualization with "3D models".

DETAILED DESCRIPTION

Detailed embodiments of the present invention are disclosed herein with reference to the drawings. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
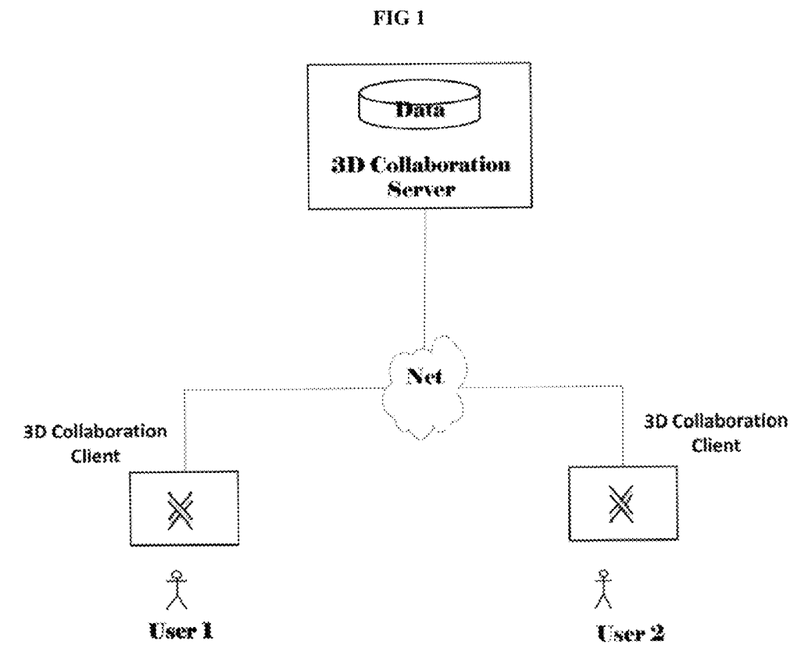
FIG. 1 is a perspective view of the system illustrating two users visualizing and interacting with an identical "3D model" via their respective "3D collaborative clients" in a real-time 3D visualization and interaction session over a computer network.

Referring to FIG. 1, the system of the invention comprises means for displaying 3D models; connecting means to connect the participating machines via a computer network; means for passing and relaying the events over the computer network in the form of messages; means for decoding said messages into equivalent events resulting in invocation of appropriate remote procedures; means for establishing sessions amongst users and means for conveying changes made in one user's 3D model to the other user's 3D model.

Various means for displaying the 3D model can be used for commercial application of the invention. Such means may include any 3D enabled display machine, including but not limited to, 3D enabled computers, PCs, laptops, tablets, mobile phones, smartphones etc. Said "3D model" comprises any 3D image, scene, animation or creation which is capable of being displayed in 3D configuration on any 3D display machine. Said "computer network" is any standard network capable of hosting and carrying the 3D files. Said "users" comprise at least two users connected through the computer network however, unlimited number of users on the computer network can simultaneously visualize, share, interact and modify a 3D model in real time. Application of the invention is not affected by the location of the users and the users can be located at the same location or at remote locations in any part of the world. However, for the explanation purposes, only two users are illustrated in the accompanying drawings.

In an exemplary embodiment of the invention, every user defines his own group similar to Instant Messaging (IM) or chat systems. A user establishes trust-relationship with a peer by first generating request on the system. If the peer accepts such a request then they both become trusted peers and can start sessions that allow "3D collaboration" sessions. The FIG. 1 shows user-1 engaged in a session with user-2. During 3D real-time visualization and interaction, at least two users on the same network select the same 3D model on their respective machine screens, enabling them to visualize the same 3D model in real-time. This loading operation is synchronized and the 3D model can be loaded from a file system on a specific user's computer or from a network location as defined by a Uniform Resource Locator (URL). In one preferred embodiment of the invention, the 3D model is loaded from a network location as defined by a Uniform Resource Locator (URL).

In a preferred embodiment of the invention, every user is provided credentials that provide identity and related privileges in the system. Credentials are of two types. One is a "tuple" consisting of simple textual username and password. The second is using industry standard digital id's using the standard X.509. Support is provided in the system for acquiring, storing and revoking these credentials in industry standard fashion. A user is allowed to "login" into the system only when the right credentials are offered. These credentials are stored in the central database. Whenever a user attempts to login, his credentials are matched against the stored values and if a right match occurs then login succeeds otherwise it is denied.

Based on the identity, appropriate access-controls can be imposed. A user's ability to view, modify or save parts of the "3D Model" can be controlled. A user specifies access to his "3D model" in terms of "view", "modify" or "save" operations and assigns such rights to his trusted-peers. When a 'request' originates from a 'peer user' in a session then it is compared to the specified "access controls" and the resulting "result" is accepted or rejected.

Figure 2:
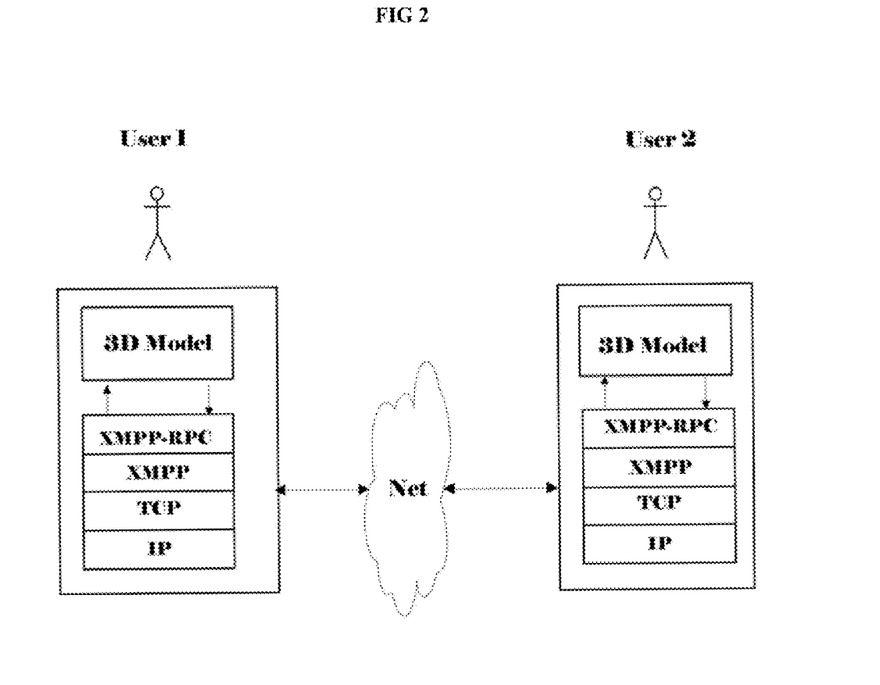
FIG. 2 is schematic representation of communication of two "3D Models" on different computers over a computer network using a stack of protocols, with XMPP-RPC/WebSocket and XMPP constituting the application level protocols running on a TCP/IP stack.

Referring to FIG. 2, there are many protocols for remote computing over the internet such as SOAP, XMPP-RPC, WebSocket etc. In one preferred embodiment of the invention XMPP-RPC protocol is used to transmit the information related to an event that originates on one of the user's machine. In another embodiment of the invention, WebSocket protocol is used to transmit the information related to an event that originates on one of the user's machine. In an exemplary embodiment of the invention, an event is packaged up as an object by the Graphical User Interface (GUI) runtime, encoded into a XMPP-RPC/WebSocket Packet and sent on the wire using methods of the XMPP-RPC/WebSocket protocol. A person skilled in the art will understand that XMPP-RPC is a publicly defined protocol. An event can be generated by user action or from within the X3D scene. An external user action can originate from a "mouse", "keyboard" or "touch" operation. This event is normally handled by an event handler on the originating user's environment. This event handler is invoked in the session user's environment via XMPP-RPC and a "method call" is initiated. This method call is routed by the XMPP server located in the network cloud. The "method call" initiated at first user's machine and routed by the XMPP server in the network cloud is processed by XMPP-RPC environment and a corresponding "method response" or an "error message" is generated. As a net result, as soon as any action in the first user's environment creates a change, the same change is identically created in the second session user's environment.

Figure 3:
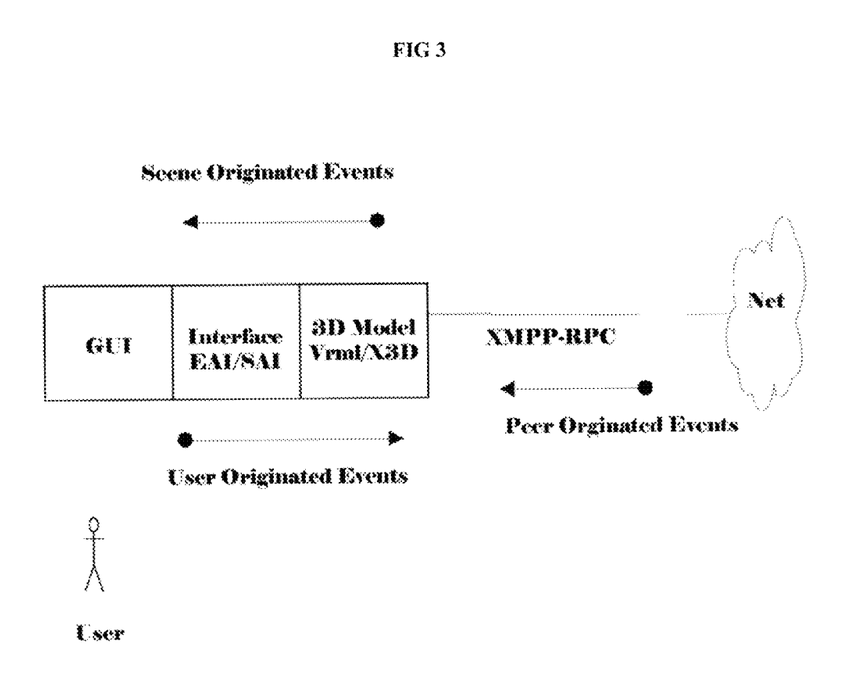
FIG. 3 is schematic representation of user and system generated events as they flow through various sub-systems such as the user-interface (UI), "3D Browser" via inter process interfaces such as EAI/SAI and network protocols such as XMPP-RPC.

FIG. 3 illustrates the lifecycle of events in the system. Events get generated within the 3D scene or by users. Events generated in the 3D Scene are trapped within the GUI runtime via callbacks that are registered via the EAI/SAI interface. User generated scenes originate via mouse, keyboard or touch actions initiated by the user. User generated events make their affect on the 3D Model as they propagate via the EAI/SAI interface. Changes to the scene such as changing appearance, adding or deleting sub objects occur via this mechanism. "3D Model" generated events originate via animations in the "3D Model". Once these events are captured in the GUI runtime they can be optionally packaged up as objects and transmitted to the environments of other users in the session. This happens using the XMPP-RPC protocol.

In an exemplary embodiment of the invention, 3D models can be collaboratively transformed in real-time in all user's machines participating in the session, said transformation in 3D models include change in appearance, geometric transformation, addition and/or deletion of sub-objects, lighting, security, querying, measurements and notes.

In one embodiment, change in appearance comprises real-time collaborative change in color and/or texture of 3D objects. In another embodiment, change in geometric transformation comprises real-time collaborative scaling, translating and rotation of the 3D objects. In another embodiment, addition can be done collaboratively in real-time from a file system local to a user or from a network location defined by "Uniform Resource Locator" (URL). In another embodiment, lighting comprises real-time collaborative addition/deletion and control of lights in the 3D scene, said lights include Directional Light, Point Light and Spot Light.

Most "3D Models" contain sub-objects. These are given explicit names as a "string" within the Vrml97 or X3D file using the "DEF" construct. These sub-objects are available in the runtime via the EAI/SAI interfaces. After a "3D Model" is loaded, the entire scene graph that corresponds to the model is traversed and a list of all such "selectable" sub-objects is created and presented to the user via a graphical control within the GUI. This allows an end user to select a specific sub-object and subsequent operations such as changing appearance can be performed. Means to unselect a sub-object is also provided.

Once a specific sub-object is selected its appearance can be changed. This is done either by changing its color or by its texture. Color itself has many sub fields such as "ambient color", "diffusion color" etc as specified in the Vrml97/X3D specifications. These values are changed via methods in the EAI/SAI interfaces. If the user is participating in a session than this change is transmitted to a peer-user via the XMPP-RPC mechanism as defined herein above. Changing texture involves defining an "image" for the texture. This image can be picked up from the user's computer or from a network store as defined by a Uniform Resource Locator (URL). When the selected sub-object further contains other objects than they are all subjected to this change by traversing the children list iteratively. Before doing this the original appearance is saved to ensure that an "undo" operation can be performed.

Further, a "3D Model" has many smaller objects contained within it. The EAI and SAI interfaces define methods to add or remove such sub-objects from the main "3D Model". These operations of "add" and "remove" operations are packaged up as XML messages and transported via the XMPP-RPC protocol to participating user's machines. There they are unpacked and the decoded remote-procedure is executed. This creates an identical effect of "add" or "remove" on a peer-machine as on the main user's machine.

In an exemplary embodiment of the invention, objects within the 3D models can be selected and transformed. After an object is selected its parent object which has to be a grouping node is sent an event that changes one of its fields, namely translation, scaling or rotation. Translation moves the selected object along one of the three co-ordinate axes, i.e. 'x', 'y' or 'z'. Scaling changes the size of the object along any of the three co-ordinate axes i.e. 'x', 'y' or 'z'. Similarly, rotation performs a rotation of the object as specified along an axis defined by the values of 'x', 'y' or 'z' co-ordinates and the vector that connects it to the origin of the co-ordinate space. All of these operations are performed per the specification of Vrml97 or X3D. This invention applies this transformation to the user's environment and transmits these changes via XMPP-RPC to a peer user's environment who is participating in the session.

Lighting has a profound effect on visualization in general. In a "3D Model" represented by standards such as Vrml or X3D there is considerable support for lighting. All three lights the Spot Light, Directional Light and Point light expose parameters that can be manipulated via the EAI/SAI interfaces which are in turn exposed to the user via Graphical User Interface (GUI). Parameters like "Intensity", "location", "range" etc significantly alter the appearance of the object. These changes can be transmitted from a user's computer to a peer-user's computer via the XMPP-RPC mechanism as described herein above paragraphs.

Vrml and X3D protocols support a notion of a Text Node. The present invention uses this node in a collaborative mode enabling note taking. A user adds a Text Node and then some text to this text node that constitute notes. This can be transmitted from the current user's computer to a peer-user's computer via XMPP-RPC as was done with other operations. Further these notes can be persisted into the local store or onto the server. For instance in an e-learning scenario, where a chemical bond is being studied in 3D, a student can write a few questions alongside the model. These questions can be dealt with in subsequent student teacher-session. These notes can be persisted on choice.

Measurements of objects such as length, area, volume can be made from a user's environment. These can be transmitted from the current user's computer to a peer-user's computer who is participating in the session. For instance in an accident-reconstruction scenario one can take photographs of the scene, reconstruct a 3D model out of that and the various stakeholders can mine important information, such as measurements out of the scene. Stakeholders such as the persons involved in the accident, the insurance companies, law enforcement companies can all come to a common understanding of parameters such as the "volume of damage" in a car accident. This can lead to accurate estimations of repair costs and ultimately leads to faster resolution of the issue amongst all the stakeholders.

Figure 4:
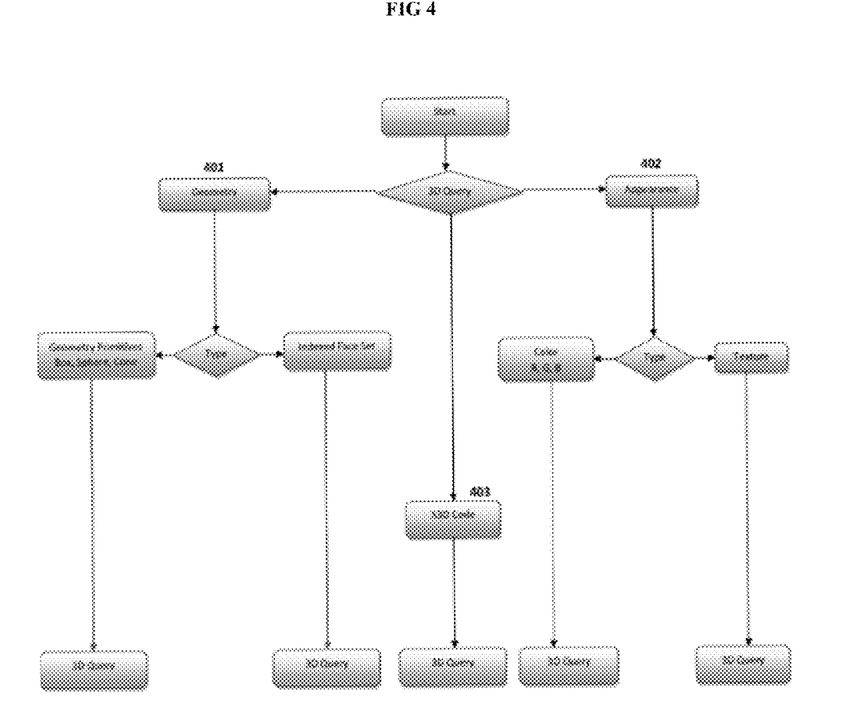
FIG. 4 illustrates the definition of a 3D query.
Figure 5:
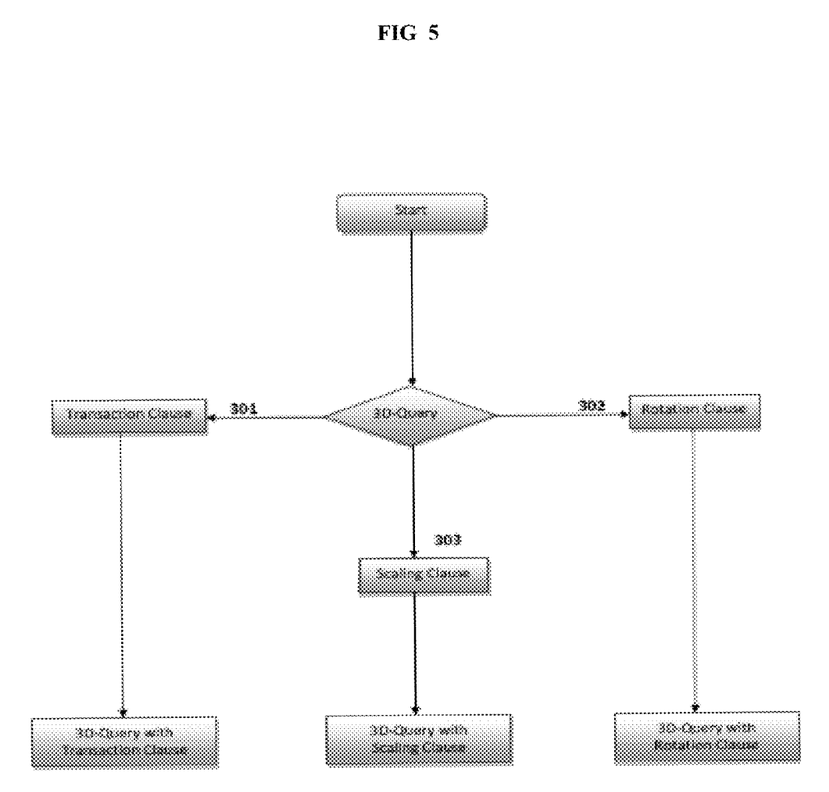
FIG. 5 is a flow chart illustrating the clauses of a 3D query.

Referring to the FIGS. 4 & 5, a 3D-Scene can be queried using 3D-Queries. FIG. 4 defines such queries and FIG. 5 defines the clauses of these 3D-Queries. A 3D-Query can have clauses for translation 301, rotation 302 and scaling 303. For example, for a 3D-Query for spheres of radius 5 units and a scaling clause of 10%, the system will return spheres that have an effective size of 4.5 units to 5.5 units. For a 3D-Query for boxes with 5 units a rotation clause of 30 degree will return all boxes that are rotated between −30 degrees and 30 degrees and for a 3D-Query for a Cone with a translation of 10 units in the x-axis will return all cones that are within −10 units and 10 units of the origin in the direction of x-axis.

A 3D-Query is formulated in several ways. It can be based on Geometry 401, Appearance 402 or by raw X3D code 403. A 3D-Query based on standard geometries such as Box, Sphere or Cone allows the end user to pick out such primitives from a palette via a "picker" tool. This is further parameterized suitably. For e.g to search for spheres of radius 5 units, a user will pick the Sphere primitive and with a value of 5 units for the radius. This forms the 3D-Query. This 3D-Query is submitted to an XML database that stores the scene in aX3D based Scenegraph. The "picker" tool packages up the X3D code into a suitable XQuery statement. This is processed by the XML database and all instances of spheres of radius 5 units are detected within the Scenegraph. For geometries that cannot be characterized by the primitives, a general purpose IndexedFaceSet node is used.

A 3D-Query based on appearance has two options. One option is to used specify color via the material field. Further parameters such as diffuse Color, can be used to specify color in greater detail. Another option is to specify appearance via a texture specified in formats such as gif, png, jpg etc. These parameters are as defined in the X3D spec. A 3D-Query based on raw X3D code uses X3D code for Geometry & Appearance nodes as specified by the X3D standard.

Figure 6:
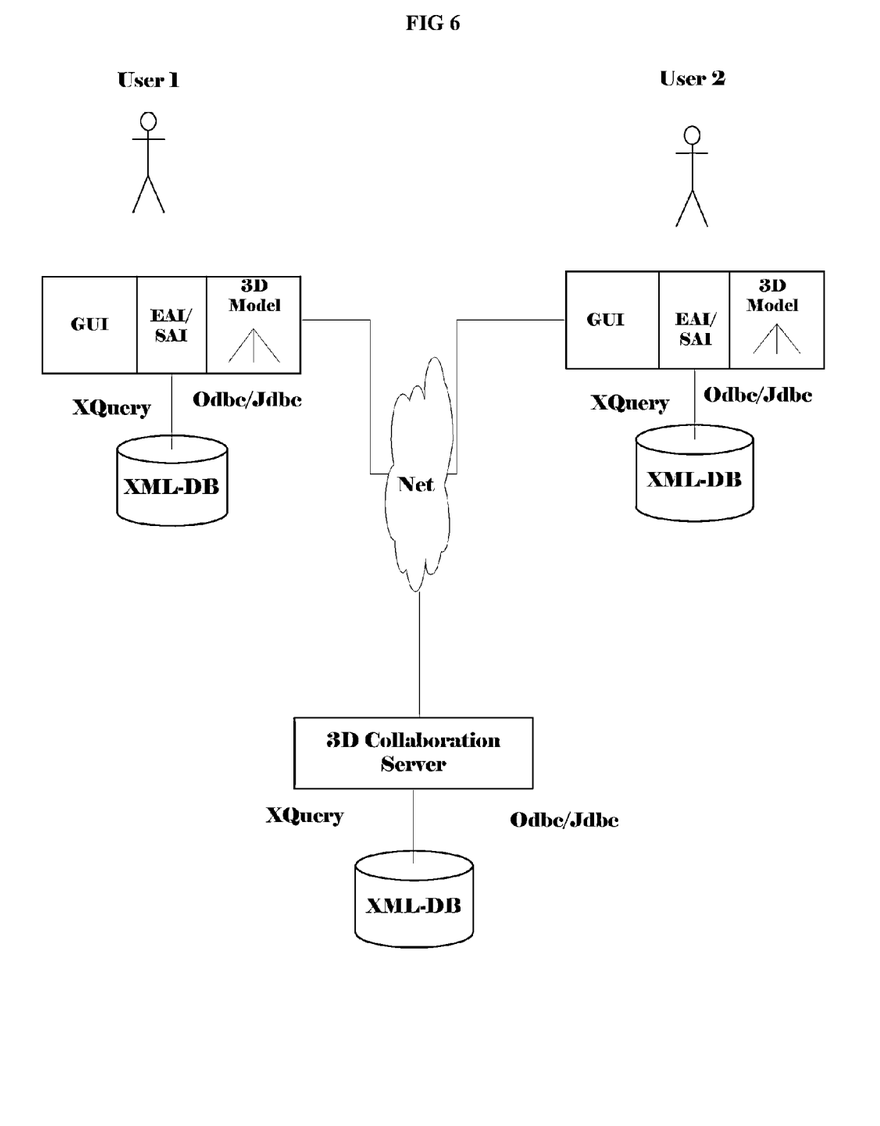
FIG. 6 is schematic representation of "3D query" support in the system, wherein "3D models" expressed in X3D encoding are stored in an XML Database and user queries captured from the Graphical User Interface (GUI) are translated into XQuery, conveyed to the XML-Database via Odbc or Jdbc, executed by the XML database and the results rendered in the "3D Collaborative client" that contains the X3D Browser.

FIG. 6 illustrates another exemplary feature of the present invention, wherein many types of "3D Queries" can be made. These queries can be against a specific 3D model or against a family of 3D models. Models are first translated into an X3D format. Since X3D is essentially XML it lends itself to storage and searches in an XML Database. An end user specifies his query criteria in a Graphical User Interface (GUI) screen. This is translated into an XQuery and fed to the XML-Database via standard interfaces such as ODBC or JDBC. The results are in X3D and are fed to the X3D Browser which renders it. The XML-Database could be in the server and accessed via a computer network or within an individual user's computer. In one example of this application of the invention, in a furniture store a user could be searching for coffee table that matches the rest of the furniture. So a query criteria where "appearance" is defined by an image texture is launched.

Figure 7:
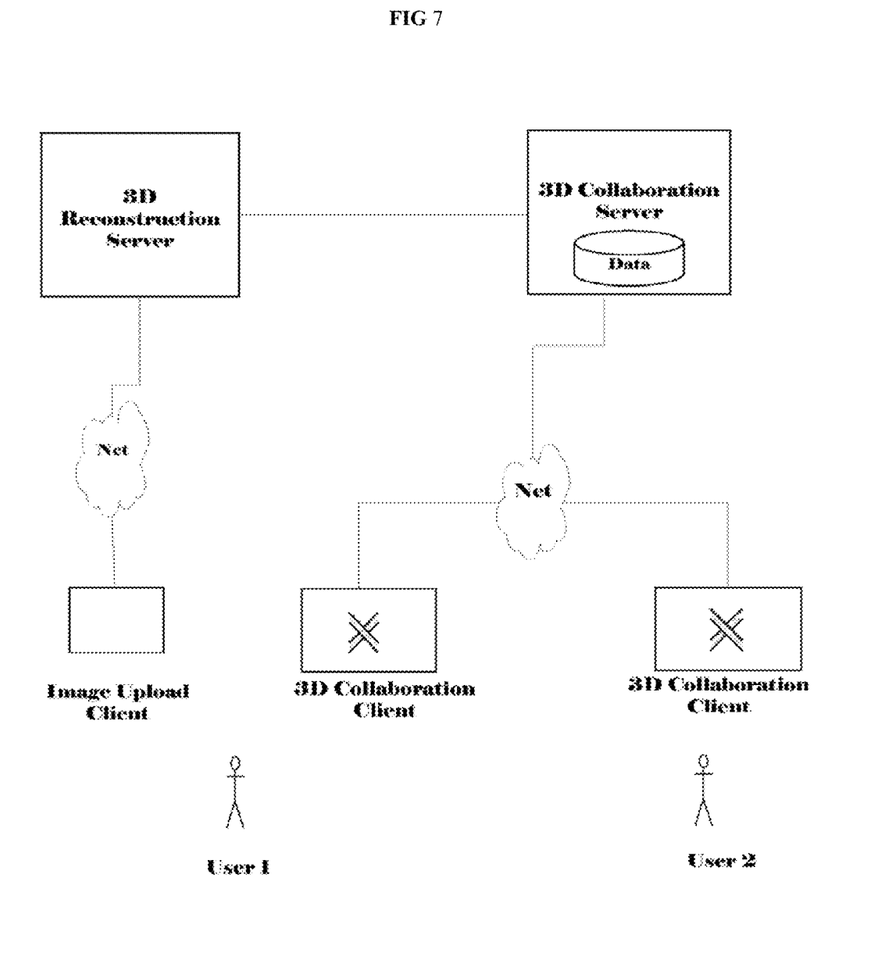
FIG. 7 is a schematic representation of the apparatus wherein a "3D Model" is reconstructed from a set of carefully created images, which are fed to the "3D Reconstruction server" which is again made available to the user for collaborative 3D visualization and real-time interaction.

FIG. 7 illustrates the apparatus of using digital images as input into the present invention for collaborative visualization in 3D and real-time interaction. Digital images taken by digital cameras or other medical imaging equipment that can be developed into a "3D Model" are uploaded by a client using the web browser's capabilities. A set of these digital images are used as an input to reconstruct a "3D Model" using multi-view 3D reconstruction technology. Many vendors offer such capabilities in the marketplace. Then the user of this system can transfer the reconstructed "3D Model" into a central server. This makes the "3D Model" available for collaborative visualization and real-time interaction. All the other capabilities of 3D collaboration described elsewhere are applicable to such a reconstructed "3D Model" also. Such capabilities include selecting sub-objects, changing appearance, querying etc.

Figure 8:
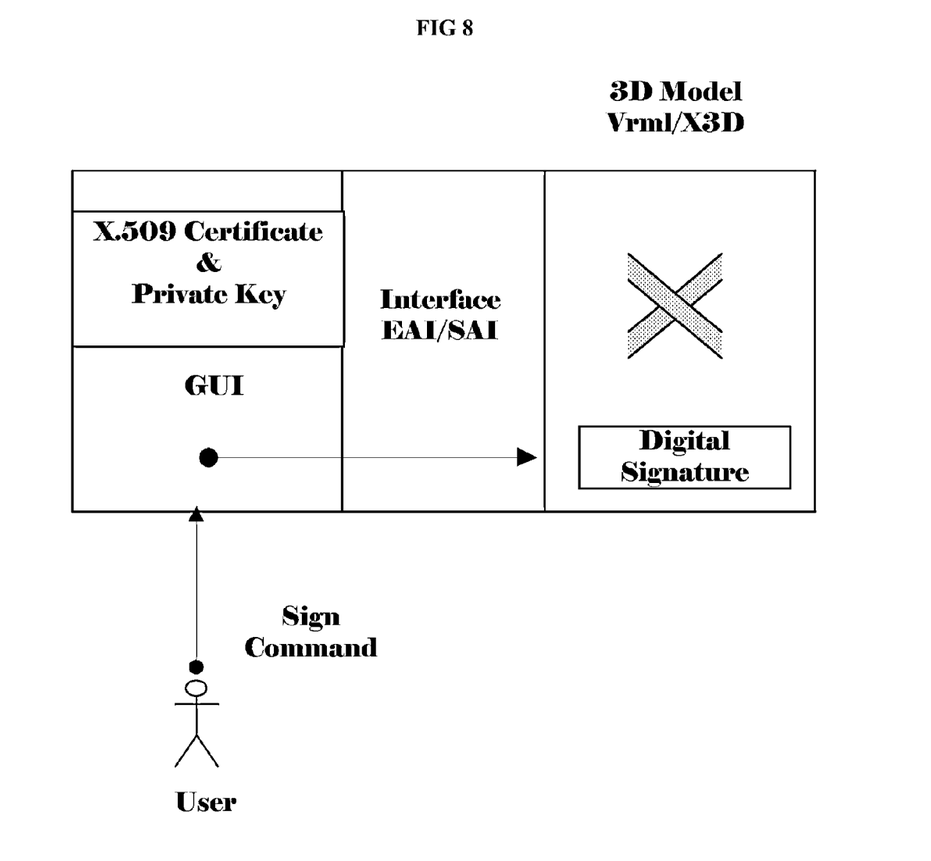
FIG. 8 is a schematic representation of the method that is used to apply a user's x.509 certificate and related private key to create a "Digital Signature" of the "3D Model" or related metadata composed of "text", or "images" or "video", or "audio".

FIG. 8 illustrates another exemplary embodiment of the present invention in digital signing operation of "3D models". When x.509 certificates are used for authentication then these certificates and related private key can be used to "digitally sign" any modifications in the "3D model" or related metadata in any media such as "text", "image", "video" or "audio". The "private key" associated with the x.509 certificate is strictly expected to be under a user's control. Consequently an operation performed with it such as an MD5 hash is considered a "digital signature" and is valid legally. Utility of such authentication can be found in one example of medical imaging and diagnostic, wherein in a healthcare situation a remote located radiologist could comment and sign-off on a reconstructed 3D model of a CT-Scan.

Figure 9:
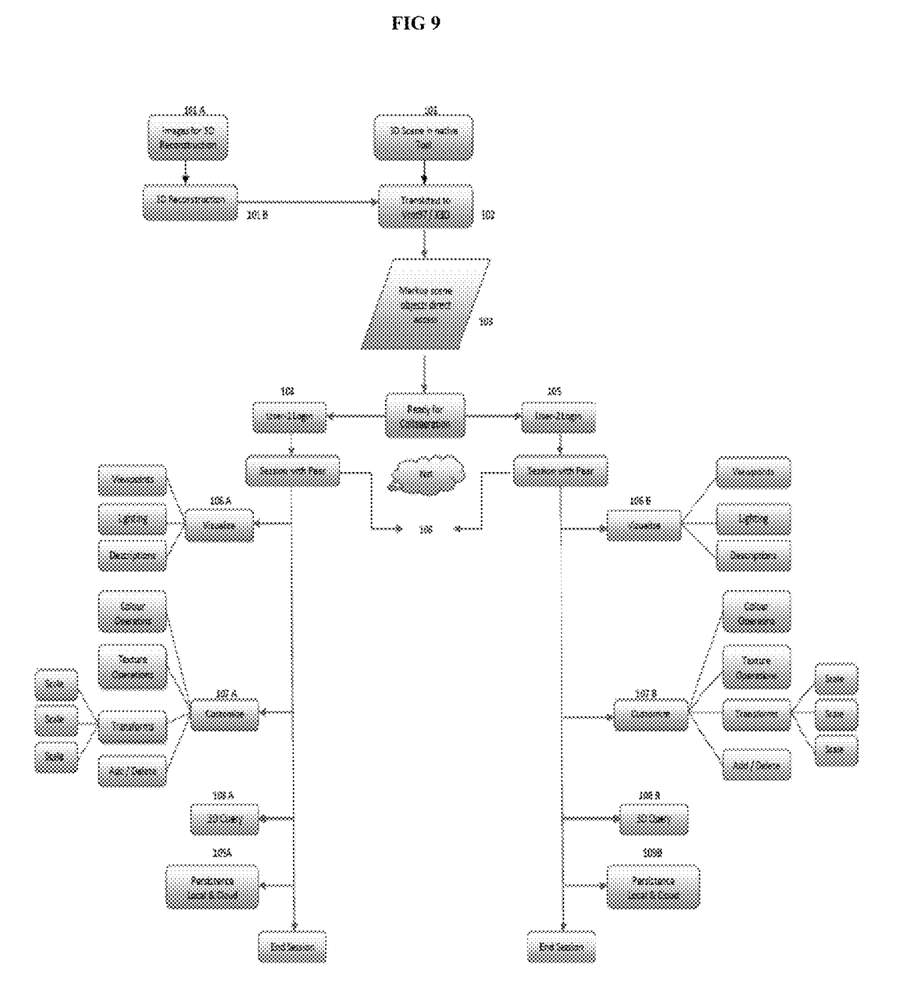
FIG. 9 is a flowchart illustrating the method of the real time 3D collaborative visualization and interaction.

Referring to FIG. 9 that describes the method of the real time 3D collaborative visualization and interaction, the 3D scene from the native tool (101) or the image for 3D reconstruction (101-A) for reconstruction which is translated to X3D format is selected (102). The user 1 and user 2 are defined and authenticated for participation in the session (104, 105). The selected 3D models are displayed in the participating user's devices in real time (106) which are connected through internet. The displayed 3D scene is passed, relayed and visualized over the network in the form of messages by the users (106A, 106-B). A 3D query is defined on user-1 system through user interface which is simultaneously propagated to user-2 system (108 A&B). The changes or the modifications made in the 3D event by user-1 are conveyed in real time to the user-2 machine which is customized and saved in the server (107 A&B) or cloud (109 AB).

Figure 10:
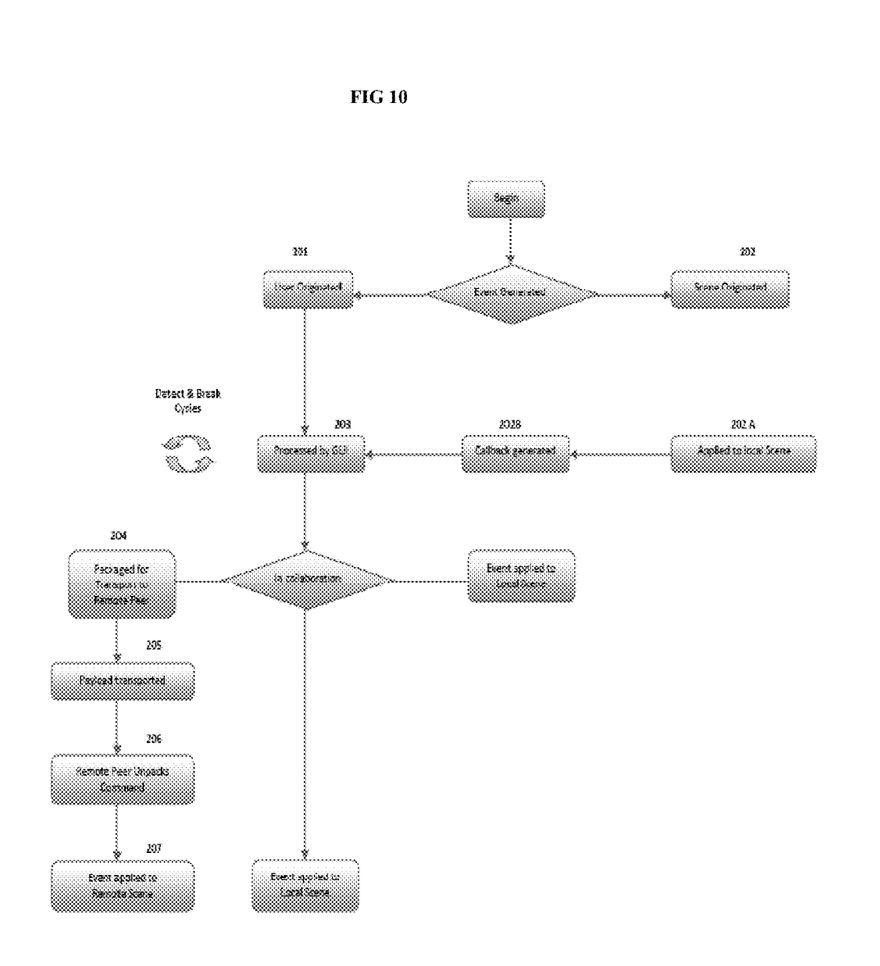
FIG. 10 is a flowchart illustrating the method of introducing modifications to the 3D scene as a 3D event.

Referring to FIG. 10 the changes or the modifications introduced in a 3D scenet can be user originated (201) or scene originated (202). In case of user originated change, it is processed by GUI (203), which is then packaged for transport to the other user in collaboration (204). The server process the method call received (205) which is then transmitted to the user-2 device where it is unpacked and decoded (206) to raise method response which is then applied to the remote 3D scene (207) and displayed as a change. In case of scene oriented change, it is applied to a local scene (202-A), for which a call back is generated (202-B) and then it is processed by GUI (203).

The present invention has diversified applications like in "online commerce", "online education", "online customer support", "online design", "healthcare" and all those fields which lend themselves to collaborative visualization with "3D models"

Applications of the present invention can be understood from given example of online e-commerce, wherein remote located buyer and seller could share and modify the design of a jewellery through real-time 3D visualization of the jewellery on their machine and real-time interaction between the buyer and the seller. An object's appearance can be changed either by the color on its surface or by the texture of its surface. This change can be transmitted from one user's environment to other session user's environment. For instance in an online e-commerce session a buyer could change the color of the gem on a ring that he is contemplating on buying. This instantly changes in the seller's environment also. The buyer and seller can then engage in a conversation using an online chat, telephony or video conferencing session. This makes the buying experience a lot more engaging. In one example, buyer could be trying out some variations in jewellery for example a ring with colored gems and stones. Through application of the present invention, as soon as the buyer replaces a "red ruby" with a "green emerald" on a ring on the screen of his machine, the same change is seen on the seller's environment. Buyer can try different options with shape, size, color and position of the stone and make changes in the 3D model of the ring in his environment on his machine which is viewed in real-time by the seller at a distant location. Seller can also suggest some changes in shape, color size, position of the gems/stones and can show him different combinations which is visualized by the buyer in real-time. Therefore, both buyer and seller can visualize and share the 3D model of the jewellery on their respective machine and can interact in real-time and modify the jewellery design simultaneously and directly without giving uploading any coded command to the server and then allowing the server to make those changes in the 3D model. This creates an effect in the buyer-seller interaction as though they are both in the same room and are experimenting with various combinations of rings.

Call centers have mushroomed all over the world due to the proliferation of telephony. Many toll-free telephone lines are a testimony to that. However in many such situations when the need to visualize an object arises for example when discussing some feature of a modern smartphone, then the caller and callee both struggle to establish a common visualization of the device under consideration and find it difficult to agree on common point. The present invention provides a solution to such conditions, wherein the invention enables a common visualization and consequently dramatically enhances their communication and ability to solve the problem.

In a general embodiment, various means for connecting participating machines via a computer network may comprise a stack of hardware and software that enables it to connect to the internet and is connected to the runtime that controls the 3D browser that renders the 3D Scene. The users may be located on the same location or at remote places and multiple number of users can simultaneously participate in the system for real-time 3D visualization, interaction and query.

The specifications for Vrml97 and X3D are in the public domain and are largely intended for a single-user usage in a client-server environment. This invention's focus is collaboration. Hence "3D Models" expressed in Vrml97 and/or X3D are augmented for collaborative usage. One such augmentation is naming specific sub-objects of the "3D Model" under consideration with specific names using the "DEF" construct of Vrml97/X3D. This makes that specific sub-object available to the runtime via EAI/SAI. This enables further manipulation of that object such as change in appearance, geometric transformation etc. Another augmentation is the use of "TimeSensor" node and the "ROUTE" directive to make a sub-object visually appealing during the selection process. In a single-user environment selecting a sub-object is fairly simple, since the user knows his own intent. In a collaborative usage where the users may be remotely located, it is important to use visual cues to bring a subject to another user's attention. This invention changes the appearance of the selected sub-object many times in a second to create the effect of blinking. This is a powerful visual cue in collaborative usage. Yet another augmentation is the use of the node "Level of Detail" or "LOD". This node is a part of the standard Vrml97/X3D. However the various "levels of detail" are all a part of the overall model and are not necessarily downloaded on demand. This makes the "3D Model" heavy. In this invention the responsibility of downloading of models of varying levels of detail is given to the end user in GUI. This enables large data sets to be brought into collaborative usage. In particular 3D data sets that come out of Medical Imaging could benefit from this. For example if an MRI data set of a lower back is being considered, a radiologist may focus on the specific area where a spinal disc herniation is observed and provide greater level of detail on it. This could include his comments or other relevant samples. Such detail could be used by a surgeon who is also involved in this case on a demand basis using the feature of "LOD" or "Level of Detail".

I claim:

1. A computer implemented real-time multi-user 3D query system comprising:
   a. plurality of users, having digital identity certificate, connected to a server wherein each user is authenticated by inputting its login and password details;
   b. a session module, associated with each authenticated user, wherein the session module allows the authenticated user to select at-least one more authenticated user from a list of all authenticated user to establish a private network between them;
   c. a database module, associated with each authenticated user of the private network, containing at-least plurality of 3D objects, wherein the database module allows at least one authenticated user of the private network to select at least one 3D object from the database module;
   d. a display module, associated with the server, wherein the display module simultaneously displays the selected 3D object in a data format on display screen of each authenticated user of the private network;

e. a modification module, associated with the display module, wherein the modification module allows at least one authenticated user of the private network to modify the 3D object by inputting 3D parameters of at least one part of the 3D object;

f. a 3D query module, associated with the server, wherein the 3D query module receives the 3D parameters from the authenticated user of the private network and computes it to output a modified 3D object along with the digital identity certificate of the corresponding authenticated user of the private network on the display screen of at-least one authenticated user of the private network; and g. a data storage module, associated with each authenticated user of the private network, wherein the modified 3D object and digital identity certificate of corresponding authenticated user are saved in the data storage module.

2. The computer implemented real-time multi-user 3D query system of claim 1 wherein each user is connected to the server by internet protocol, virtual private network or XMPP protocol, session initiation protocol or websockets protocol.

3. The computer implemented real-time multi-user 3D query system of claim 1 wherein the session module is a graphical user interface or command line interface.

4. The computer implemented real-time multi-user 3D query system of claim 1 wherein the database module is a local hard disk, an XML database server or an internet URL.

5. The computer implemented real-time multi-user 3D query system of claim 1 wherein the display module is a graphical user interface or a command line interface.

6. The computer implemented real-time multi-user 3D query system of claim 1 wherein the modification module is a list of editing options present in the display module.

7. The computer implemented real-time multi-user 3D query system of claim 1 wherein the 3D object is textual with embedded images and/or video.

8. The computer implemented real-time multi-user 3D query system of claim 1 wherein the authenticated user selects the 3D parameters from predefined options.

9. The computer implemented real-time multi-user 3D query system of claim 1 wherein the digital identity certificate is an industry standard x509 digital certificate used to sign off the modification created by at least one authenticated user.

10. The computer implemented real-time multi-user 3D query system of claim 1 wherein the data storage module is an XML database, a local hard disk, the server or a network URL.

11. The computer implemented real-time multi-user 3D query system of claim 1 wherein the data format is Vrml97/X3D format.

12. A computer implemented method for inputting real time multi-user 3D query, the method comprising the steps of:

a. authenticating plurality of users, having digital identity certificate, connected to a server by inputting login and password details of each user;

b. allowing the authenticated user to select at-least one more authenticated user from a list of all authenticated users visible in a session module to establish a private network between them;

c. allowing at least one authenticated user of the private network to select at least one 3D object from a database module;

d. enabling a display module to display the selected 3D object in a data format simultaneously on the display screen of each authenticated user of the private network;

e. allowing at least one authenticated user of the private network to modify the 3D object by inputting 3D parameters of at least one part of the 3D object in a modification module;

f. receiving 3D parameters from the authenticated user of the private network by a 3D query module of the server and computing it to output a modified 3D object along with digital identity certificate of the corresponding authenticated user of the private network on the display screen of at-least one authenticated user of the private network; and g. saving modified 3D object and digital identity certificate of corresponding authenticated user of the private network in a data storage module.

13. The computer implemented method for inputting real time multi-user 3D query of claim 12 wherein each user is connected to the server by internet protocol, virtual private network or XMPP protocol, session initiation protocol or websockets protocol.

14. The computer implemented method for inputting real time multi-user 3D query of claim 12 wherein the session module is a graphical user interface or command line interface.

15. The computer implemented method for inputting real time multi-user 3D query of claim 12 wherein the database module is a local hard disk, an XML database server or an internet URL.

16. The computer implemented method for inputting real time multi-user 3D query of claim 12 wherein the display module is a graphical user interface or command line interface.

17. The computer implemented method for inputting real time multi-user 3D query of claim 12 wherein the modification module is a list of editing options present in the display module.

18. The computer implemented method for inputting real time multi-user 3D query of claim 12 wherein the 3D object is textual with embedded images and/or video.

19. The computer implemented method for inputting real time multi-user 3D query of claim 12 wherein the authenticated user selects the 3D parameters from predefined options.

20. The computer implemented method for inputting real time multi-user 3D query of claim 12 wherein the digital identity certificate is an industry standard x509 digital certificate used to sign off the modification created by at least one authenticated user.

21. The computer implemented method for inputting real time multi-user 3D query of claim 12 wherein the data storage module is an XML database, a local hard disk, the server or a network URL.

22. The computer implemented method for real-time multi-user 3D query system of claim 12 wherein the data format is Vrml97/X3D format.

* * * * *